(12) United States Patent
Imamura

(10) Patent No.: US 7,492,999 B2
(45) Date of Patent: Feb. 17, 2009

(54) OPTICAL FIBER AND OPTICAL-FIBER TRANSMISSION LINE

(75) Inventor: Katsunori Imamura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/046,059

(22) Filed: Mar. 11, 2008

(65) Prior Publication Data

US 2008/0226246 A1 Sep. 18, 2008

(30) Foreign Application Priority Data

Mar. 12, 2007 (JP) ............................ 2007-062099
Sep. 6, 2007 (JP) ............................ 2007-231912

(51) Int. Cl.
*G02B 6/02* (2006.01)

(52) U.S. Cl. .................... 385/124; 385/123; 385/126; 385/127; 385/128; 385/141; 398/79; 398/81; 398/84; 398/87

(58) Field of Classification Search ............ 385/24, 385/122–128, 141, 144; 398/28, 29, 79, 398/81, 84, 87
See application file for complete search history.

(56) References Cited

U.S. PATENT DOCUMENTS

| 6,535,678 B1 * | 3/2003 | Yamauchi et al. | 385/123 |
| RE38,086 E * | 4/2003 | Onishi et al. | 385/123 |
| 6,768,847 B2 * | 7/2004 | DiGiovanni et al. | 385/123 |
| 7,254,305 B2 * | 8/2007 | Mishra | 385/127 |
| 2002/0102082 A1 * | 8/2002 | Sarchi et al. | 385/123 |
| 2006/0039665 A1 * | 2/2006 | Matsuo et al. | 385/127 |

FOREIGN PATENT DOCUMENTS

JP 2004-271904 9/2004

OTHER PUBLICATIONS

Yanming Liu, et al., "Single-Mode Dispersion-Shifted Fibers with Large Effective Area for Amplified Systems", IOOC 95, PD2-9, pp. 37-38.
David W. Peckham, et al., "Reduced Dispersion Slope, Non-Zero Dispersion Fiber", ECOC, Sep. 20-24, 1998, pp. 1-3.
N. Kumano, et al., Novel NZ-DSF with Ultra-low Dispersion Slope Lower than 0.020 ps/nm$^2$/km, ECOC, 2001, PD.A. 1.5, pp. 54-55.
U.S. Appl. No. 12/041,230, filed Mar. 3, 2008, Imamura.
U.S. Appl. No. 12/046,059, filed Mar. 11, 2008, Imamura.
U.S. Appl. No. 12/133,782, filed Jun. 5.,2008, Imamura.

* cited by examiner

*Primary Examiner*—Brian Healy
*Assistant Examiner*—Hung Lam
(74) *Attorney, Agent, or Firm*—Oblon, Spivak, McClelland, Maier & Neustadt, P.C.

(57) ABSTRACT

An optical fiber transmits at least a signal light having a wavelength of 1550 nanometers in a fundamental propagation mode. The optical fiber has, a cutoff wavelength equal to or longer than 1550 nanometers, a wavelength dispersion of 4 ps/nm/km to 7 ps/nm/km in the fundamental propagation mode at the wavelength of 1550 nanometers, a dispersion slope of a positive value equal to or smaller than 0.03 ps/nm$^2$/km in the fundamental propagation mode at the wavelength of 1550 nanometers, an effective core area equal to or larger then 60 μm$^2$ in the fundamental propagation mode at the wavelength of 1550 nanometers, and a bending loss equal to or smaller than 20 dB/m with a winding of 16 turns at a diameter of 20 millimeters in the fundamental propagation mode at the wavelength of 1550 nanometers.

4 Claims, 24 Drawing Sheets

FIG.2

| PARAMETER | Δ1 | Δ2 | Δ3 | b/a | c/a | 2a |
|---|---|---|---|---|---|---|
| UNIT | % | % | % | - | - | μm |
| VALUE | 0.4 | -0.1 | 0.3 | 2.54 | 3.48 | 7.61 |

FIG.3

| PARAMETER | WAVELENGTH DISPERSION | SLOPE | DPS | MFD | Aeff | THEORETICAL CUT-OFF WAVELENGTH | | β/k |
|---|---|---|---|---|---|---|---|---|
| | | | | | | LP11 | LP02 | |
| UNIT | ps/nm/km | ps/nm²/km | nm | μm | μm² | nm | nm | - |
| VALUE | 5.2 | 0.015 | 340 | 9.36 | 72.2 | 3023 | 2216 | 1.44649 |

FIG.12

| PROPAGATION MODE | COUPLING EFFICIENCY |
|---|---|
| LP01 | 0.92 |
| LP02 | 0.08 |
| LP11 | $4.2 \times 10^{-34}$ |
| LP21 | $2.3 \times 10^{-35}$ |

FIG.13

| PARAMETER | Δ1 | Δ2 | Δ3 | b/a | c/a | 2a |
|---|---|---|---|---|---|---|
| UNIT | % | % | % | - | - | $\mu m$ |
| FIRST CALCULATION EXAMPLE | 0.39 | -0.5 | 0.3 | 1.64 | 2.56 | 8.81 |
| SECOND CALCULATION EXAMPLE | 0.39 | -0.3 | 0.3 | 1.88 | 2.8 | 8.46 |
| THIRD CALCULATION EXAMPLE | 0.4 | -0.1 | 0.3 | 2.54 | 3.48 | 7.61 |

FIG. 14

| PARAMETER | WAVELENGTH DISPERSION | SLOPE | DPS | MFD | Aeff | THEORETICAL CUT-OFF WAVELENGTH | | β/k | S/C RATIO |
|---|---|---|---|---|---|---|---|---|---|
| | | | | | | LP11 | LP02 | | |
| UNIT | ps/nm/km | ps/nm²/km | nm | μm | μm² | nm | nm | - | - |
| FIRST CALCULATION EXAMPLE | 5.4 | 0.013 | 406 | 8.90 | 71.8 | 2552 | 2048 | 1.44649 | 0.55 |
| SECOND CALCULATION EXAMPLE | 5.4 | 0.015 | 369 | 9.08 | 72.3 | 2690 | 2098 | 1.44649 | 0.57 |
| THIRD CALCULATION EXAMPLE | 5.2 | 0.015 | 340 | 9.36 | 72.2 | 3023 | 2216 | 1.44649 | 0.63 |

FIG.21

| PARAMETER | Δ1 | Δ2 | Δ3 | b/a | c/a | 2a |
|---|---|---|---|---|---|---|
| UNIT | % | % | % | - | - | μm |
| FOURTH CALCULATION EXAMPLE | 0.4 | -0.1 | 0.2 | 2.28 | 3.8 | 7.64 |
| FIFTH CALCULATION EXAMPLE | 0.4 | -0.1 | 0.3 | 2.54 | 3.48 | 7.61 |
| SIXTH CALCULATION EXAMPLE | 0.41 | -0.1 | 0.4 | 2.72 | 3.44 | 7.4 |

FIG.22

| PARAMETER | WAVELENGTH DISPERSION | SLOPE | DPS | MFD | Aeff | THEORETICAL CUT-OFF WAVELENGTH | | $\beta/k$ | S/C RATIO |
|---|---|---|---|---|---|---|---|---|---|
| | | | | | | LP11 | LP02 | | |
| UNIT | ps/nm/km | ps/nm²/km | nm | μm | μm² | nm | nm | - | - |
| FOURTH CALCULATION EXAMPLE | 4.8 | 0.014 | 355 | 9.42 | 71.7 | 3167 | 2243 | 1.44650 | 0.54 |
| FIFTH CALCULATION EXAMPLE | 5.2 | 0.015 | 340 | 9.36 | 72.2 | 3023 | 2216 | 1.44649 | 0.63 |
| SIXTH CALCULATION EXAMPLE | 4.7 | 0.015 | 321 | 9.21 | 71.0 | 2977 | 2208 | 1.44650 | 0.65 |

FIG.23

| PARAMETER | Δ1 | α1 | Δ2 | Δ3 | b/a | c/a | 2a |
|---|---|---|---|---|---|---|---|
| UNIT | % | - | % | % | - | - | μm |
| SEVENTH CALCULATION EXAMPLE | 0.48 | 2 | -0.1 | 0.3 | 2.08 | 2.86 | 9.71 |
| EIGHTH CALCULATION EXAMPLE | 0.415 | 6 | -0.1 | 0.3 | 2.29 | 3.14 | 8.5 |
| NINTH CALCULATION EXAMPLE | 0.4 | step | -0.1 | 0.3 | 2.54 | 3.48 | 7.61 |

FIG.24

| PARAMETER | WAVELENGTH DISPERSION | SLOPE | DPS | MFD | Aeff | THEORETICAL CUT-OFF WAVELENGTH | | β/k | S/C RATIO |
|---|---|---|---|---|---|---|---|---|---|
| | | | | | | LP11 | LP02 | | |
| UNIT | ps/nm/km | ps/nm²/km | nm | μm | μm² | nm | nm | - | - |
| SEVENTH CALCULATION EXAMPLE | 5.0 | 0.014 | 366 | 9.48 | 72.0 | 3178 | 2275 | 1.44649 | 0.59 |
| EIGHTH CALCULATION EXAMPLE | 5.1 | 0.015 | 337 | 9.39 | 71.8 | 3047 | 2224 | 1.44649 | 0.61 |
| NINTH CALCULATION EXAMPLE | 5.2 | 0.015 | 340 | 9.36 | 72.2 | 3023 | 2216 | 1.44649 | 0.63 |

FIG.25

| PARAMETER | Δ1 | Δ2 | Δ3 | b/a | c/a | 2a |
|---|---|---|---|---|---|---|
| UNIT | % | % | % | - | - | μm |
| TENTH CALCULATION EXAMPLE | 0.41 | -0.1 | 0.3 | 2.38 | 3.28 | 7.49 |
| ELEVENTH CALCULATION EXAMPLE | 0.4 | -0.1 | 0.3 | 2.54 | 3.48 | 7.61 |
| TWELFTH CALCULATION EXAMPLE | 0.4 | -0.1 | 0.3 | 2.63 | 3.65 | 7.74 |

FIG.26

| PARAMETER | WAVELENGTH DISPERSION | SLOPE | DPS | MFD | Aeff | THEORETICAL CUT-OFF WAVELENGTH | | $\beta/k$ | S/C RATIO |
|---|---|---|---|---|---|---|---|---|---|
| | | | | | | LP11 | LP02 | | |
| UNIT | ps/nm/km | ps/nm²/km | nm | $\mu$m | $\mu$m² | nm | nm | - | - |
| TENTH CALCULATION EXAMPLE | 4.8 | 0.028 | 174 | 9.36 | 71.7 | 2778 | 2132 | 1.44651 | 0.55 |
| ELEVENTH CALCULATION EXAMPLE | 5.2 | 0.015 | 340 | 9.36 | 72.2 | 3023 | 2216 | 1.44649 | 0.63 |
| TWELFTH CALCULATION EXAMPLE | 5.2 | 0.000 | 174720 | 9.28 | 71.3 | 3288 | 2296 | 1.44652 | 0.68 |

FIG.27

| PARAMETER | WAVELENGTH DISPERSION | S/C RATIO |
|---|---|---|
| UNIT | ps/nm/km | - |
| THIRTEENTH CALCULATION EXAMPLE | 4 | 0.57 |
| FOURTEENTH CALCULATION EXAMPLE | 5 | 0.63 |
| FIFTEENTH CALCULATION EXAMPLE | 6 | 0.68 |

FIG.28

| PARAMETER | Aeff | S/C RATIO |
|---|---|---|
| UNIT | $\mu m^2$ | - |
| SIXTEENTH CALCULATION EXAMPLE | 60 | 0.72 |
| SEVENTEENTH CALCULATION EXAMPLE | 70 | 0.63 |
| EIGHTEENTH CALCULATION EXAMPLE | 80 | 0.54 |

FIG.29

| PARAMETER | β/k | S/C RATIO |
|---|---|---|
| NINETEENTH CALCULATION EXAMPLE | 1.4465 | 0.63 |
| TWENTIETH CALCULATION EXAMPLE | 1.4470 | 0.62 |
| TWENTY-FIRST CALCULATION EXAMPLE | 1.4475 | 0.58 |

FIG.30

| PARAMETER | Δ1 | α1 | Δ2 | Δ3 | b/a | c/a | 2a |
|---|---|---|---|---|---|---|---|
| UNIT | % | - | % | % | - | - | μm |
| FIRST EXAMPLE | 0.42 | 5 | -0.1 | 0.33 | 2.16 | 3.25 | 8.75 |
| SECOND EXAMPLE | 0.42 | 6 | -0.1 | 0.36 | 2.11 | 3.31 | 9.36 |
| THIRD EXAMPLE | 0.51 | 2 | -0.43 | 0.24 | 1.46 | 2.4 | 9.63 |
| FOURTH EXAMPLE | 0.39 | 10 | -0.21 | 0.28 | 1.98 | 3 | 9.03 |
| FIFTH EXAMPLE | 0.42 | 6 | -0.1 | 0.32 | 2.11 | 3.18 | 8.72 |

FIG.31

| PARAMETER | WAVELENGTH DISPERSION | SLOPE | DPS | MFD | Aeff | TRANSMISSION LOSS | BENDING LOSS | λc |
|---|---|---|---|---|---|---|---|---|
| UNIT | ps/nm/km | ps/nm²/km | nm | μm | μm² | dB/km | dB/m | nm |
| FIRST EXAMPLE | 6.2 | 0.024 | 258 | 8.71 | 65.2 | 0.247 | 20 | 2800 |
| SECOND EXAMPLE | 5 | 0.018 | 278 | 9.21 | 72.0 | 0.235 | 12 | 3100 |
| THIRD EXAMPLE | 4.4 | 0.015 | 294 | 8.68 | 60.9 | 0.215 | 5 | 2200 |
| FOURTH EXAMPLE | 5.7 | 0.001 | 10836 | 9.29 | 74.0 | 0.224 | 9 | 2800 |
| FIFTH EXAMPLE | 5.7 | 0.018 | 317 | 8.73 | 65.4 | 0.198 | 18 | 2900 |

| TYPE | WAVELENGTH DISPERSION | SLOPE | Aeff | TRANSMISSION LOSS |
|---|---|---|---|---|
| | ps/nm/km | ps/nm²/km | $\mu m^2$ | dB/km |
| LARGE-Aeff-TYPE | 5 | 0.09 | 72 | 0.195 |
| LOW-SLOPE-TYPE | 5 | 0.045 | 53 | 0.195 |
| ULTRA-LOW-SLOPE-TYPE | 5 | 0.02 | 45 | 0.195 |

OPTICAL FIBER AND OPTICAL-FIBER TRANSMISSION LINE

BACKGROUND OF THE INVENTION

1. Field of the Invention

The present invention relates to an optical fiber and an optical-fiber transmission line for a large-capacity optical transmission.

2. Description of the Related Art

When wavelength division multiplexing (WDM) is executed to realize large-capacity communication, a noise may be generated in an optical-fiber transmission line, which is caused by a four-wave mixing (FWM) that is a kind of nonlinear optical phenomena. To suppress this noise, for example, a nonzero dispersion-shifted optical fiber that has small wavelength dispersion at the wavelength of a signal light used for the optical transmission is used as the optical-fiber transmission line. The nonzero dispersion-shifted optical fiber has, for example, the wavelength dispersion of about 5 ps/nm/km at a wavelength of 1550 nanometers that is the wavelength of the signal light.

On the other hand, important optical characteristics of an optical fiber used in an optical-fiber transmission line in a WDM transmission system can be the effective core area and the dispersion slope characteristics. In the WDM transmission, the optical power of the signal light transmitted in the optical-fiber transmission line is increased. Therefore, to suppress the generation of the nonlinear optical phenomena caused by this increase of the optical power, it is important to lower the intensity density of the light beam in the core of the optical fiber by expanding the effective core area of the optical fiber.

In a broadband WDM transmission system aiming at large-capacity communication, to reduce the deviation of the wavelength dispersion in a wavelength band used, a dispersion flat property in the broadband, that is, a low dispersion slope characteristic is required for the optical-fiber transmission line. For example, when the S-band (1460 nanometers to 1530 nanometers), the C-band (1530 nanometers to 1565 nanometers), and the L-band (1565 nanometers to 1625 nanometers) are used as the wavelength bands, it is said to be preferable that the wavelength dispersion in each of the bands should be kept to a value between 2 ps/nm/km with which the generation of the FWM can sufficiently be suppressed and 8 ps/nm/km with which distortion of the waveform of the optical signal caused by the wavelength dispersion can be suppressed.

For an optical fiber, a trading-off relation is always present between the effective core area and the dispersion slope characteristics. Therefore, a problem is present that it is difficult to simultaneously realize expansion of the effective core area and a low dispersion slope characteristic.

FIG. 37 is a table of optical characteristics at the wavelength of 1550 nanometers of nonzero dispersion-shifted optical fibers respectively of a large-Aeff-type having the expanded effective core area, a low-slope-type having a reduced dispersion slope, and an ultralow-slope-type. In FIG. 37, "Slope" represents a dispersion slope and "Aeff" represents an effective core area. FIG. 38 is a graph of the relationship between the wavelength and the wavelength dispersion of each nonzero dispersion-shifted optical fiber shown in FIG. 37.

As shown in FIG. 37: the large-Aeff-type nonzero dispersion-shifted optical fiber has the effective core area that is expanded to 70 $\mu m^2$ or larger; and the low-slope-type and the ultralow-slope-type nonzero dispersion-shifted optical fibers have the dispersion slope that are reduced to 0.045 ps/nm$^2$/km and 0.02 ps/nm$^2$/km, respectively (see e.g., Y. Liu, et al., "Single-mode dispersion-shifted fibers with large effective area for amplified systems", IOOC 1995, PD2-9 (1995), D. W. Peckam, et al., "Reduced dispersion slope, nonzero dispersion fiber", ECOC 1998, p. 139 (1998), and N. Kumano, et al., "Novel NZ-DSF with ultralow dispersion slope lower than 0.020 ps/nm$^2$/km", ECOC 2001, PD. A. 1. 5 (2001)).

On the other hand, a technique is disclosed that uses a multi-mode optical fiber as a technique of significantly expanding the effective core area (see, e.g., Japanese Patent Application Laid-Open No. 2004-2719049).

However, problems have been arisen that the above large-Aeff-type nonzero dispersion-shift optical fiber has the dispersion slope of about 0.09 ps/nm$^2$/km that is large and, therefore, the deviation of the wavelength dispersion for the entire optical-fiber transmission line can not be sufficiently reduced, and that the low-slope-type nonzero dispersion-shift optical fiber has the effective core area of about 50 $\mu m^2$ that is small and, therefore, the generation of the nonlinear optical phenomena can not sufficiently be suppressed.

SUMMARY OF THE INVENTION

It is an object of the present invention to at least partially solve the problems in the conventional technology.

According to an aspect of the present invention, there is provided an optical fiber that transmits at least a signal light including a wavelength of 1550 nanometers in a fundamental propagation mode. The optical fiber has, a cutoff wavelength equal to or longer than 1550 nanometers, a wavelength dispersion of 4 ps/nm/km to 7 ps/nm/km in the fundamental propagation mode at the wavelength of 1550 nanometers, a dispersion slope of a positive value equal to or smaller than 0.03 ps/nm$^2$/km in the fundamental propagation mode at the wavelength of 1550 nanometers, an effective core area equal to or larger then 60 $\mu m^2$ in the fundamental propagation mode at the wavelength of 1550 nanometers, and a bending loss equal to or smaller than 20 dB/m with a winding of 16 turns at a diameter of 20 millimeters in the fundamental propagation mode at the wavelength of 1550 nanometers.

Furthermore, according to another aspect of the present invention, there is provided an optical-fiber transmission line including an optical fiber that transmits at least a signal light having a wavelength of 1550 nanometers in a fundamental propagation mode, the optical fiber having, a cutoff wavelength equal to or longer than 1550 nanometers, a wavelength dispersion of 4 ps/nm/km to 7 ps/nm/km in the fundamental propagation mode at the wavelength of 1550 nanometers, a dispersion slope of a positive value equal to or smaller than 0.03 ps/nm$^2$/km in the fundamental propagation mode at the wavelength of 1550 nanometers, an effective core area equal to or larger then 60 $\mu m^2$ in the fundamental propagation mode at the wavelength of 1550 nanometers, and a bending loss equal to or smaller than 20 dB/m with a winding of 16 turns at a diameter of 20 millimeters in the fundamental propagation mode at the wavelength of 1550 nanometers; and a single-mode optical fiber configured to be connected to the optical fiber, the single-mode optical fiber having a cutoff wavelength shorter than 1550 nanometers. The signal light is input into the optical fiber through the single-mode optical fiber.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table of an example of design parameters of the optical fiber according to the first embodiment;

FIG. 3 is a table of optical characteristics of the optical fiber calculated by a numerical simulation using the design parameters shown in FIG. 2;

FIG. 12 is a table of a relationship between a propagation mode and a coupling efficiency of a signal light to the propagation mode;

FIG. 13 is a table of design parameters of optical fibers of a first to a third calculation examples;

FIG. 14 is a table of the optical characteristics and S/C ratios of the optical fibers of the first to the third calculation examples;

FIG. 21 is a table of the design parameters of each of the optical fibers of a fourth to a sixth calculation examples;

FIG. 22 is a table of the optical characteristics and the S/C ratio of each of the optical fibers of the fourth to the sixth calculation examples;

FIG. 23 is a table of the design parameters of each of the optical fibers of a seventh to a ninth calculation examples;

FIG. 24 is a table of the optical characteristics and the S/C ratio of each of the optical fibers of the seventh to the ninth calculation examples;

FIG. 25 is a table of the design parameters of each of the optical fibers of a tenth to a twelfth calculation examples;

FIG. 26 is a table of the optical characteristics and the S/C ratio of each of the optical fibers of the tenth to the twelfth calculation examples;

FIG. 27 is a table of the relationship between the wavelength dispersion and the S/C ratio obtained when the design parameters were optimized such that the wavelength dispersion was varied;

FIG. 28 is a table of the relationship between the effective core area and the S/C ratio obtained when the design parameters were optimized such that the effective core area was varied;

FIG. 29 is a table of the relationship between $\beta/k$ and the S/C ratio obtained when the design parameters were optimized such that $\beta/k$ was varied;

FIG. 30 is a table of the design parameters of the optical fibers of a first to a fourth examples;

FIG. 31 is a table of the optical characteristics of the optical fibers according to the first to the fourth examples;

DETAILED DESCRIPTION OF THE PREFERRED EMBODIMENTS

Figure 1:
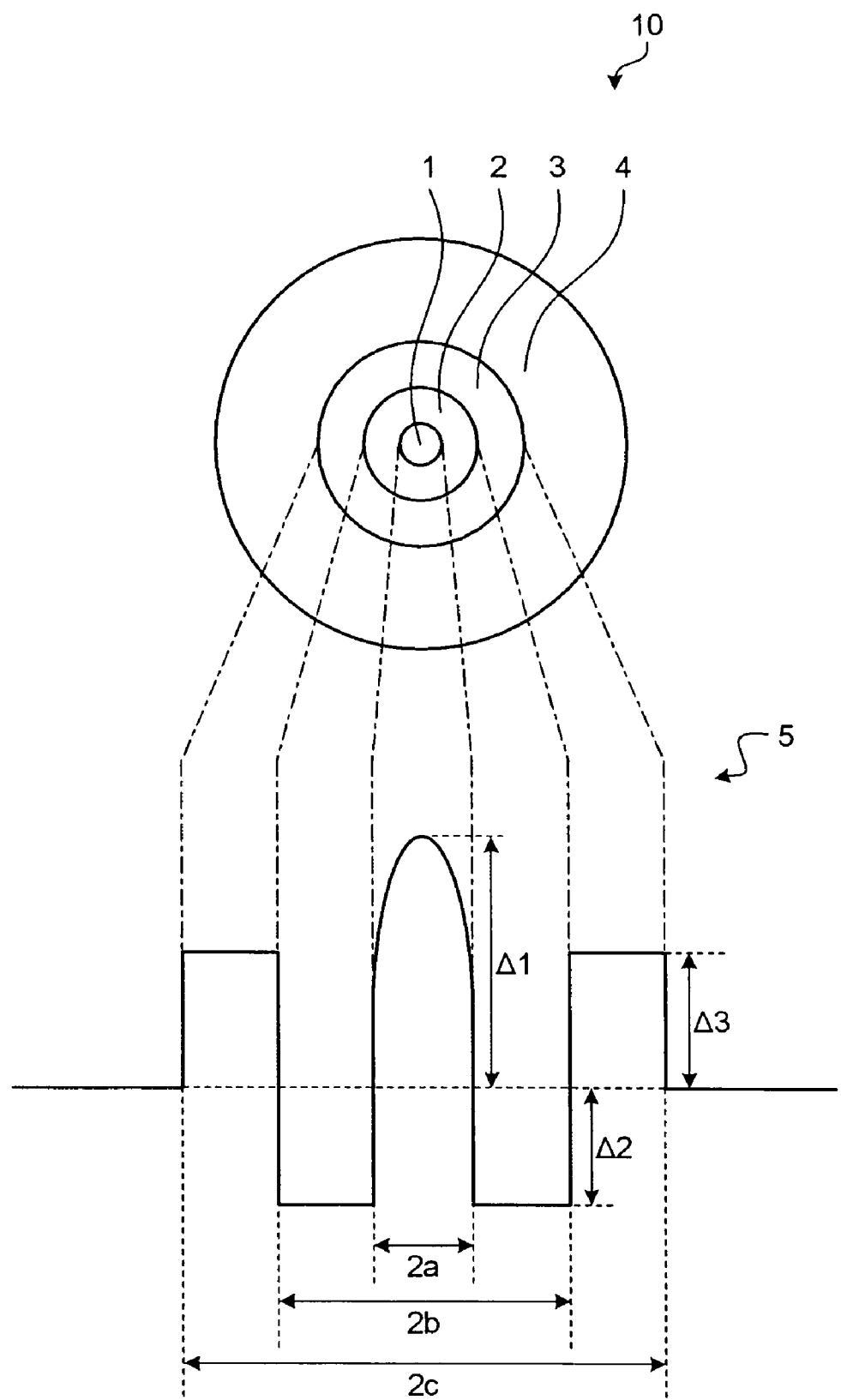
FIG. 1 is a schematic diagram of a cross-section and a refractive index profile of an optical fiber according to a first embodiment of the present invention.

Exemplary embodiments of an optical fiber and an optical-fiber transmission line according to the present invention are explained in detail below with reference to the accompanying drawings. However, the present invention is not limited by these embodiments. A "Bending loss" in the specification means a bending loss generated when an optical fiber is wound for 16 turns at a diameter of 20 millimeters. When simply referred to as a "cutoff wavelength", this term means a fiber cutoff wavelength $\lambda c$ defined by ITU-T (International Telecommunication Union Telecommunication Standardization Sector) G.650.1. In addition, terms that are not specifically defined herein follow the definition and the measuring methods in ITU-T G.650.1.

An optical fiber according to a first embodiment of the present invention is an optical fiber that transmits a WDM signal light in a wavelength band of 1530 nanometers to 1565 nanometers that is the C-band in the fundamental propagation mode and that has: the cutoff wavelength of 1550 nanometers or longer; the wavelength dispersion in the fundamental propagation mode at the wavelength of 1550 nanometers of 4 ps/nm/km to 7 ps/nm/km; the dispersion slope of a positive value of 0.03 ps/nm²/km or smaller; the effective core area of 60 µm² or larger; and the bending loss of 20 dB/m or smaller.

That is, the optical fiber according to the first embodiment is a multimode optical fiber for which a plurality of propagation mode at the wavelength of a signal light that is shorter than the cutoff wavelength are present such as an LP02 mode, an LP11 mode, and an LP21 mode that are high order modes in addition to an LP01 mode that is the fundamental propagation mode. As a result a tradeoff relationship between the effective core area and the dispersion slope conventionally occurred by limitation in designing such as that the cutoff wavelength must be made shorter than the shortest signal light wavelength to manufacture the optical fiber as a single-mode optical fiber for which only the fundamental propagation mode is present as the propagation mode is facilitated in the fundamental propagation mode. As a result, as to the characteristics in the fundamental propagation mode at the wavelength of 1550 nanometers, the optical fiber has the effective core area that is equal to that of a conventional large-Aeff-type nonzero dispersion-shifted optical fiber, and the dispersion slope that is significantly smaller than that of a conventional low-slope-type nonzero dispersion-shifted optical fiber. Therefore, increase of the deviation of the accumulated wavelength dispersion between signal lights can be significantly suppressed compared to that of the conventional case while generation of the nonlinear phenomena can be suppressed to the same level as that of the conventional case.

Furthermore, because the above trading-off relation is moderated, the optical fiber according to the first embodiment realizes the above effective core area and dispersion slope and lowers the bending loss to 20 dB/m that is sufficiently low.

To transmit each signal light in the fundamental propagation mode using the optical fiber according to the first embodiment, for example, a single-mode optical fiber having the cutoff wavelength that is shorter than the wavelength of each signal light is connected to the optical fiber and a signal light is input into the optical fiber according to the first embodiment through this single-mode optical fiber. As a result, only the fundamental propagation mode is selectively excited and the optical fiber according to the first embodiment transmits each signal light in the fundamental propagation mode.

Description will be given in detail for the structure and the design parameters of the optical fiber according to the first embodiment. FIG. 1 is a schematic diagram of a cross-section and a refractive index profile of an optical fiber 10 according to the first embodiment. As shown in FIG. 1, the optical fiber 10 includes a center core region 1, an inner core layer 2 that is formed on the circumference of the center core region 1 and that has a refractive index lower than that of the center core region 1, an outer core layer 3 that is formed on the circumference of the inner core layer 2 and that has a refractive index lower than that of the center core region 1 and higher than that of the inner core layer 2, and a cladding layer 4 that is formed on the circumference of the outer core layer 3 and that has a refractive index higher than that of the inner core layer 2 and lower than that of the outer core layer 3. That is, the optical fiber 10 has a W-segment-type refractive index profile 5. The center core region 1 has an α-type refractive index profile. The inner core layer 2 and the outer core layer 3 each have a step-type refractive index profile.

Denoting an α-value as α1, which is a parameter that defines the α-type refractive index profile, α1 is defined by $$n^2(r) = n_{core}^2 \times \{1 - 2 \times (\Delta/100) \times (r/a)^{\alpha 1}\} \quad (1)$$

where $0 < r < a$, $r$ represents a position in the radial direction from the center of the center core region, $n(r)$ represents the refractive index at the position $r$, $n_{core}$ represents the refractive index at $r=0$ in the center core region, and "a" represents the radius of the center core region. The symbol "^" is a symbol that represents an exponential.

As to design parameters of the optical fiber 10, in the refractive index profile 5, the relative refractive index difference Δ1 of the center core region 1 to the cladding layer 4 is 0.55% or smaller, the relative refractive index difference Δ2 of the inner core layer 2 to the cladding layer 4 is −0.7% to 0%, the relative refractive index difference Δ3 of the outer core layer 3 to the cladding layer 4 is 0.1% to 0.5%, a ratio b/a of the outer diameter 2b of the inner core layer 2 to the diameter 2a of the center core region 1 is 1.4 or larger, a ratio c/a of the outer diameter 2c of the outer core layer 3 to the diameter 2a of the center core region 1 is 2.1 or larger, and the diameter 2a of the center core region 1 is 6.8 micrometers or larger.

When the optical fiber 10 has the above structure and design parameters, the optical fiber 10 has as above: the cutoff wavelength of 1550 nanometers or longer; the wavelength dispersion in the fundamental propagation mode at the wavelength of 1550 nanometers of 4 ps/nm/km to 7 ps/nm/km; the dispersion slope of a positive value of 0.03 ps/nm²/km or smaller; the effective core area of 60 μm² or larger; and the bending loss of 20 dB/m or smaller.

FIG. 2 is a table of an example of design parameters of the optical fiber 10. FIG. 3 is a table of the optical characteristics of the optical fiber 10 calculated using numerical simulation with the design parameters shown in FIG. 2. In FIG. 3, "DPS" represents a dispersion per slope that is a value obtained by dividing the wavelength dispersion by the dispersion slope, "MFD" represents the mode field diameter, and "β/k" represents the effective refractive index obtained by dividing the propagation constant β by the wave number k. The values other than the theoretical cutoff in FIG. 3 are all values obtained at the wavelength of 1550 nanometers. When β/k is 1.4465, the bending loss is about 10 dB/m.

Figure 4:
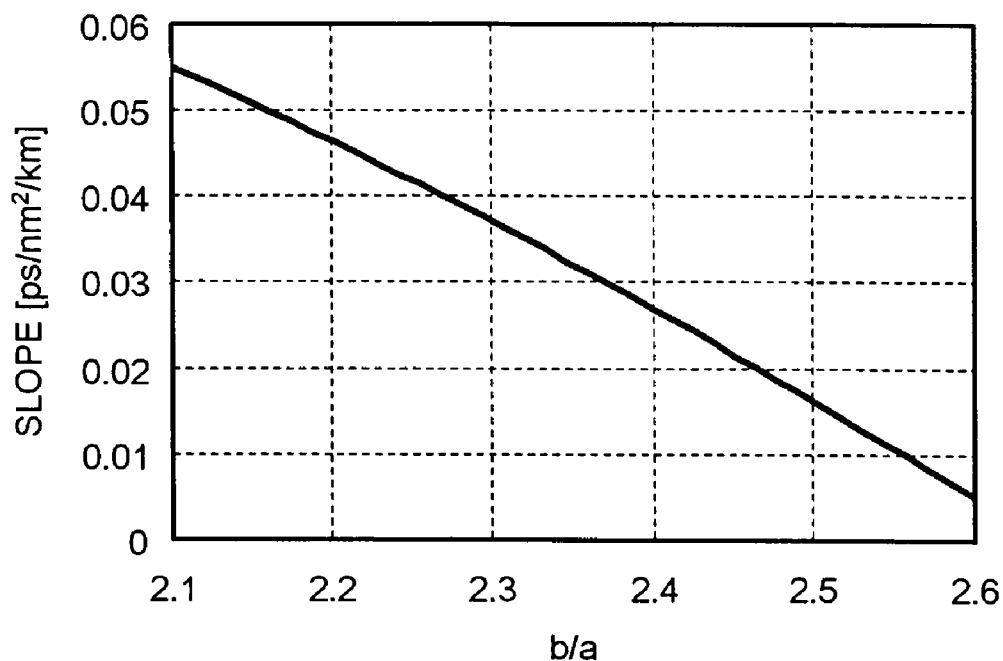
FIG. 4 is a graph of a relationship between b/a and dispersion slope.
Figure 5:
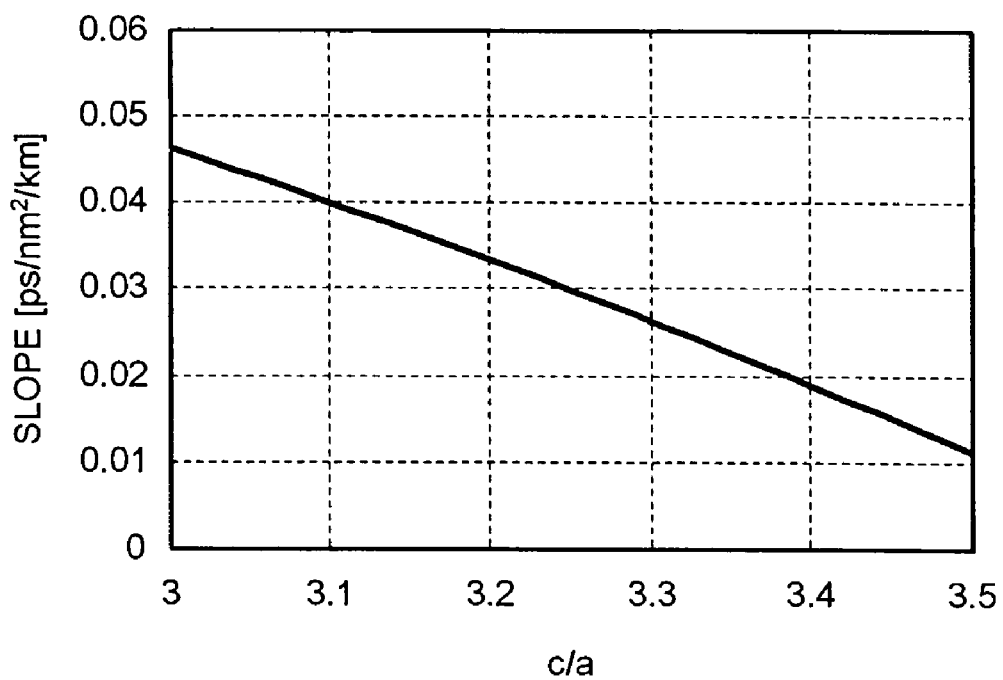
FIG. 5 is a graph of a relationship between c/a and dispersion slope.

Description will further be given in detail for the design parameters of the optical fiber 10 referring to the calculation results of the numerical simulation. For optical characteristics, the design parameters were checked to set, in an LP01 mode that is the fundamental propagation mode, the dispersion slope at a positive value of 0.03 ps/nm²/km or smaller and the effective core area at 60 μm² or larger maintaining the wavelength dispersion at 4 ps/nm/km to 7 ps/nm/km and β/k at 1.4465. Assuming that all of the center core region 1, the inner core layer 2, and the outer core layer 3 each have a step-type refractive index profile, when Δ2 was fixed at −0.1% and Δ3 was fixed at 0.3%, the relation was calculated between Δ1, b/a, c/a, or 2a that is a design parameter and the dispersion slope or the effective core area. As a result, as shown in FIGS. 4 and 5, it was verified that a correlation was present between b/a and c/a, and the dispersion slope and, when b/a was set at 2.35 or larger and 2.64 or smaller and c/a was set at 3.25 or larger and 3.63 or smaller, the dispersion slope could be set at a positive value of 0.03 ps/nm²/km or smaller.

Figure 6:
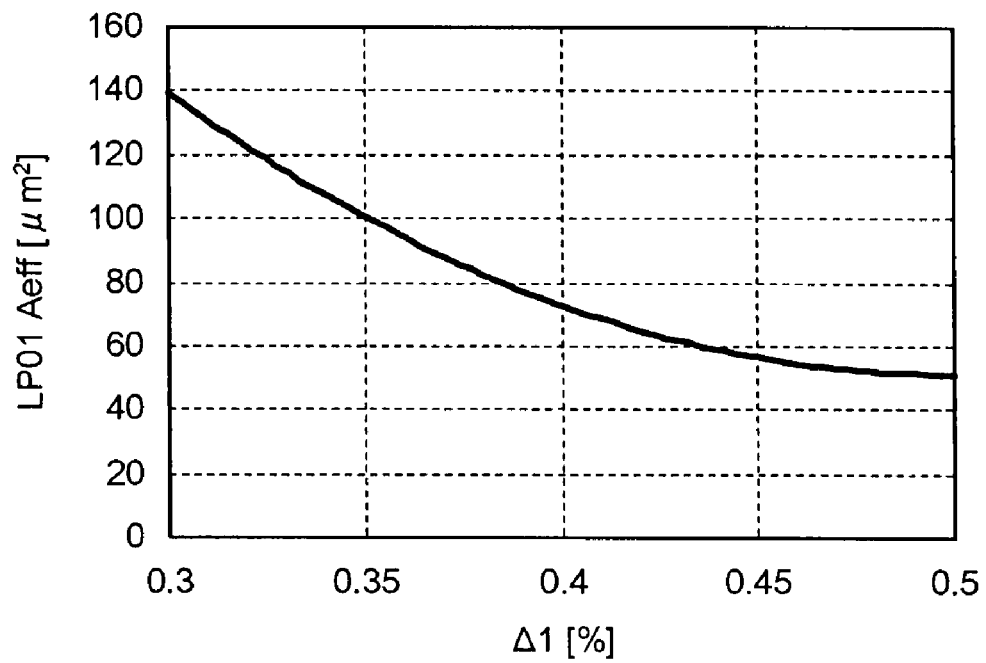
FIG. 6 is a graph of a relationship between $\Delta 1$ and effective core area.
Figure 7:
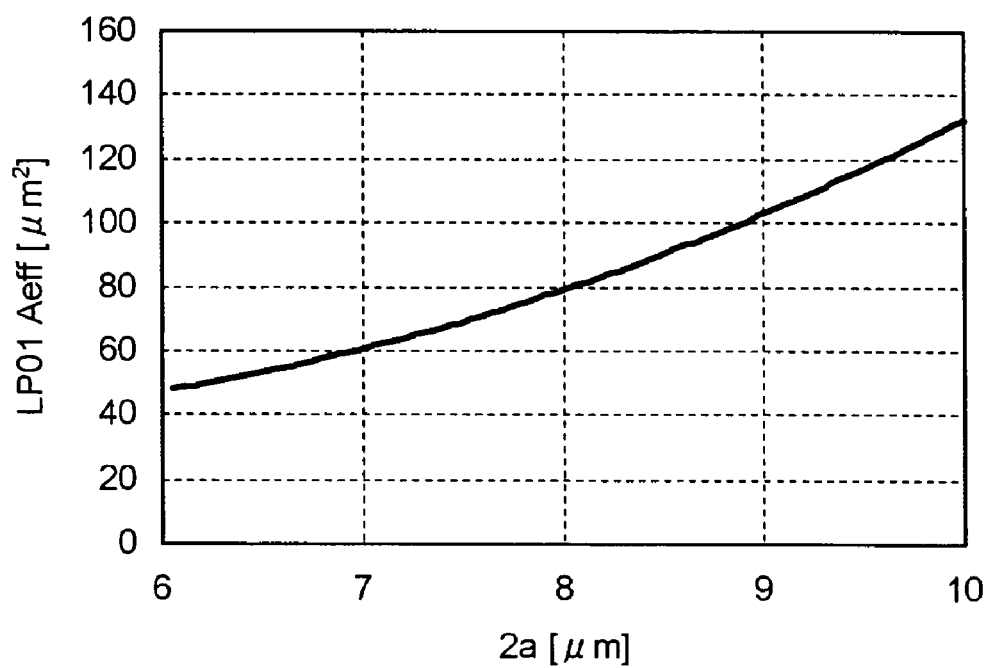
FIG. 7 is a graph of a relationship between $2a$ and effective core area.

As shown in FIGS. 6 and 7, it was verified that a correlation was present between Δ1 and 2a, and the effective core area and, when Δ1 was set at 0.44% or less and 2a is set at 6.9 micrometers or larger, the effective core area could be set at 60 μm² or larger.

Similarly, assuming that the center core region 1 has an α-type refractive index profile and both of the inner core layer 2 and the outer core layer 3 each have the step-type refractive index profile, calculation was also executed for the case where α1 is varied from two to the infinity with which the refractive index profile becomes the step type, Δ2 is varied between −0.7% to 0%, and Δ3 is varied between 0.1% to 0.5%. As a result, as above, it was verified that, when Δ1 was set at 0.55% or less, Δ2 was set between −0.7 and 0%, Δ3 was set between 0.1 and 0.5%, b/a was set at 1.4 or larger and 2.7 or smaller, c/a was set at 2.1 or larger and 5.2 or smaller, and 2a was set at 6.8 micrometers or larger, the wavelength dispersion was 4 ps/nm/km to 7 ps/nm/km, β/k was 1.4465, the dispersion slope was a positive value of 0.03 ps/nm²/km or smaller, and the effective core area was 60 μm² or larger.

Description will be given for the propagation modes in the optical fiber 10 according to the first embodiment. FIGS. 8 to 11 are figures of propagation mode field distributions at the wavelength of 1550 nanometers of the optical fiber 10. FIGS. 8 to 11 are diagrams respectively of the LP01 mode, the LP02 mode, the LP11 mode, and the LP21 mode. In each of FIGS. 8 to 11, the axis of abscissa represents the distance from the center of the center core region and the axis of abscissa represents the electric field intensity of the field in arbitrary units. Colored portions in FIGS. 8 to 11 each represent a region of presence of the field distribution of a standard single-mode optical fiber of which the zero-dispersion wavelength is about 1310 nanometers.

Figure 8:
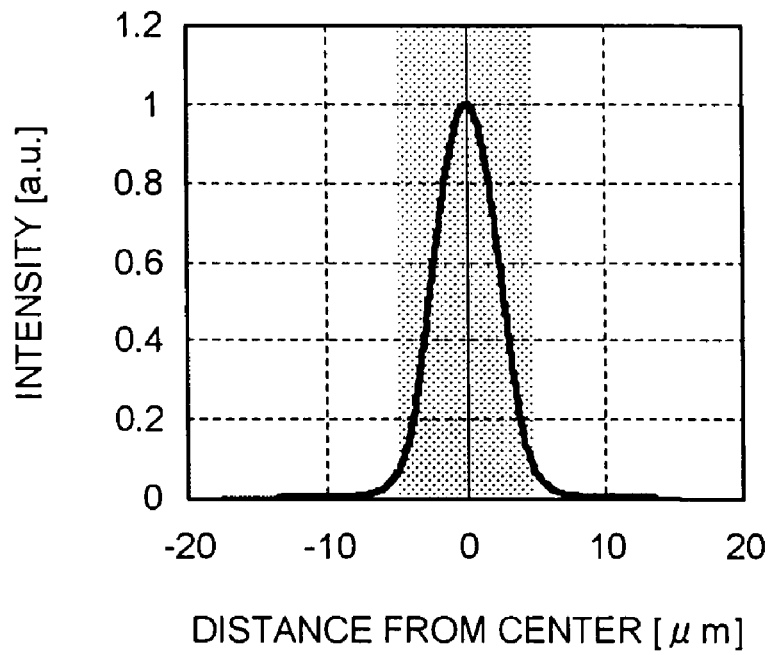
FIG. 8 is a graph of a field distribution of an LP01 mode of the optical fiber at the wavelength of 1550 nanometers according to the first embodiment.
Figure 9:
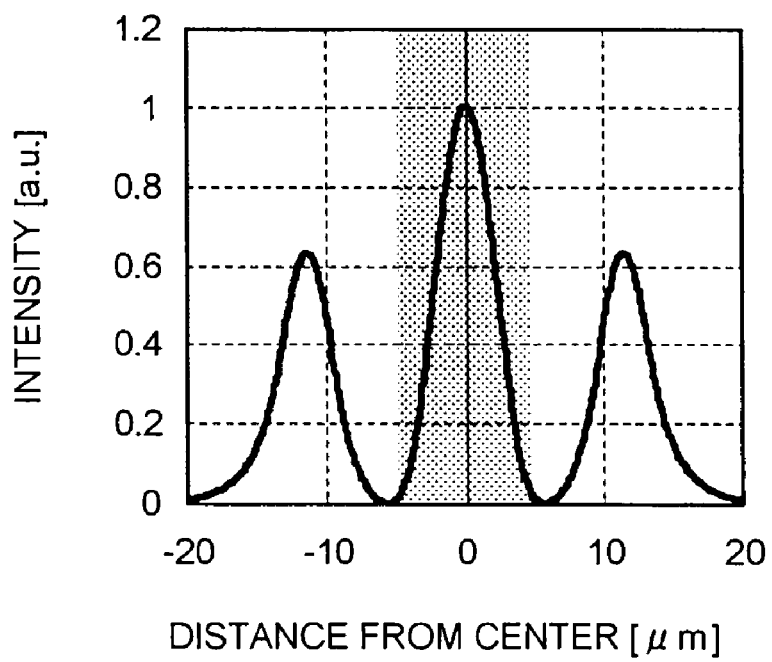
FIG. 9 is a graph of a field distribution of an LP02 mode of the optical fiber at the wavelength of 1550 nanometers according to the first embodiment.
Figure 10:
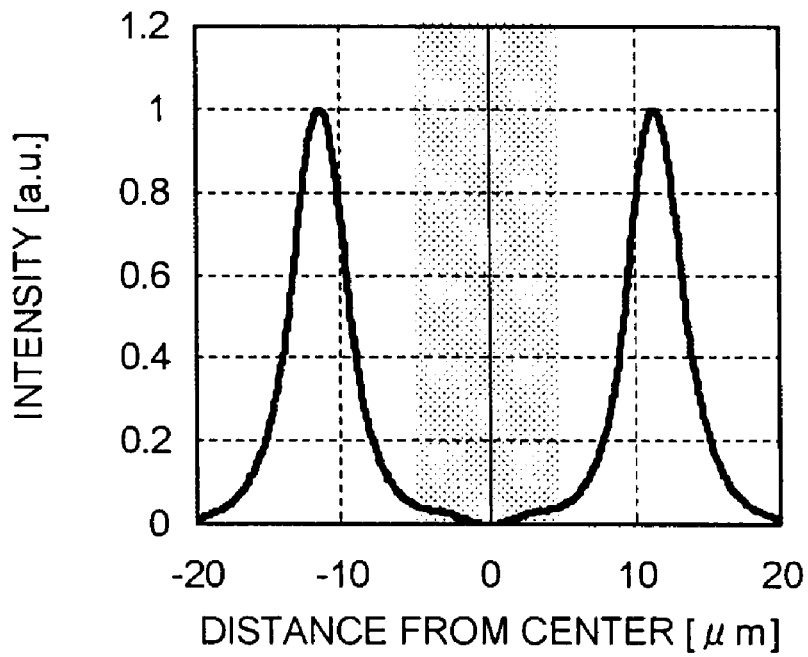
FIG. 10 is a graph of a field distribution of an LP11 mode of the optical fiber at the wavelength of 1550 nanometers according to the first embodiment.
Figure 11:
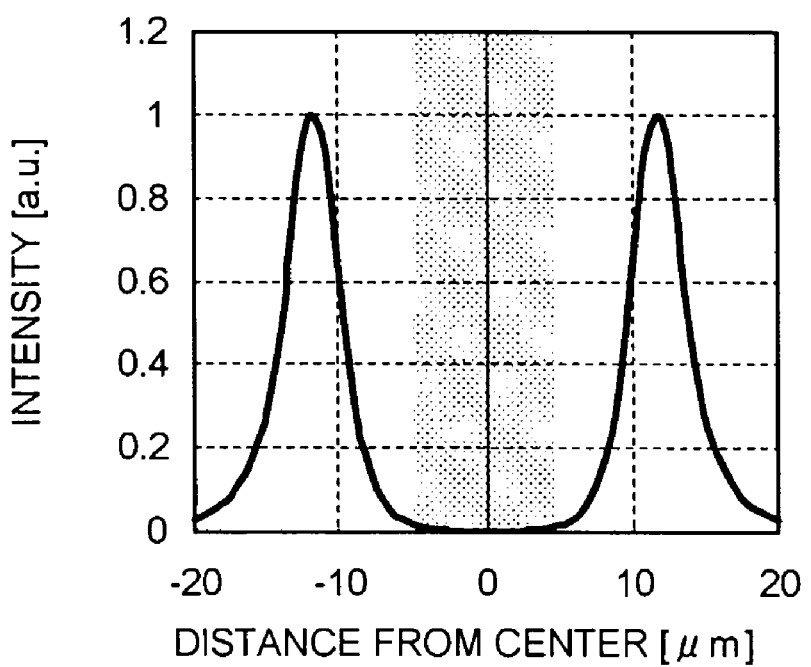
FIG. 11 is a graph of a field distribution of an LP21 mode of the optical fiber at the wavelength of 1550 nanometers according to the first embodiment.

As shown in FIG. 8, in the LP01 mode, the field distributes having a peak at around the center of the center core region. As shown in FIG. 9, in the LP02 mode, the field distributes having peaks at around the center of the center core region and a position externally to the center core region. As shown in FIGS. 10 and 11, in each of the LP11 mode and the PL 21 mode, the field distributes having a peak at a position externally to the center core region.

The case where a standard single-mode optical fiber is connected to the optical fiber 10 and a signal light at the wavelength of 1550 nanometers is input into the optical fiber 10 therethrough is considered. In this case, the field distribution of the standard single-mode optical fiber is present in the colored portion. However, as shown in FIG. 8, the colored portion and the LP01-mode field distribution overlap each other at around the center. As a result, when a signal light at the wavelength of 1550 nanometers is input into the optical fiber 10 through the standard single-mode optical fiber, the LP01 mode is sufficiently excited. On the other hand, in FIGS. 10 and 11, the colored portions and the field distributions respectively of the LP11 mode and the LP21 mode almost do not overlap each other. As a result, the LP11 mode and the LP21 mode are considered almost not to be excited. On the other hand, in FIG. 9, the LP02 mode may be excited because the colored portion and the LP02-mode field distribution overlap each other at around the center.

The coupling efficiency to each propagation mode of the signal light for the case where a standard single-mode optical fiber was connected to the optical fiber 10 and a signal light at the wavelength of 1550 nanometers was input into the optical fiber 10 therethrough was calculated using the numerical simulation.

FIG. 12 is a table of the relationship between the propagation modes and the coupling efficiency of the signal light to each of the propagation mode. As shown in FIG. 12, the coupling efficiency to the LP01 mode was 0.92 that was large as estimated from the overlapping of the field distribution. The coupling efficiency to each of PL11 mode and the LP21 mode was a small value that was very close to zero. On the other hand, the coupling efficiency to the LP02 mode was 0.08 and was a sufficiently small value compared to the coupling efficiency to the LP01 mode. Therefore, it was verified that only the LP01 mode that was substantially the fundamental propagation mode could be selectively excited by connecting a standard single-mode optical fiber to the optical fiber 10 and inputting a signal light at the wavelength of 1550 nanometers into the optical fiber 10 therethrough.

The inventors considered exciting the LP01 mode at higher efficiency by controlling the mode field distribution of an LP02 mode of the optical fiber 10. Description therefor will be given below in detail.

As above, the LP02 mode has a field distribution having peaks respectively at around the center of the center core region and a position external to the center core region. The inventors considered that the rate of the LP02 mode excited when a signal light is input through a single-mode optical fiber can be more suppressed as the rate of the field distribution at the center becomes smaller. The inventors checked how the field shape of the LP02 mode is varied by the design parameters of the optical fiber 10.

The ratio of the height of a side peak at the position external to the center core region to the height of the center peak located at around the center was defined as S/C ratio, and this ratio was used as an index of the comparison of field shapes. When the S/C ratio becomes larger, the rate of the distribution at the center that accounts for in the entire field distribution of the lP02 mode becomes smaller and, therefore, the LP02 mode becomes more difficult to be excited. This means that the LP01 mode can be excited at higher efficiency.

Description will be given below for calculation using numerical simulation. Assuming that all of the center core region 1, the inner core layer 2, and the outer core layer 3 each have the step-type refractive index profile, the field shape in the LP02 mode was checked fixing Δ3 at 0.3% and varying Δ2, as a first to a third calculation examples. The design parameters of Δ1, b/a, c/a, and 2a were properly optimized such that, at the wavelength of 1550 nanometers in the LP01 mode, the wavelength dispersion was 5 ps/nm/km, β/k was 1.4465, the dispersion slope was 0.015 ps/nm²/km, and the effective core area was 72 μm².

FIG. 13 is a table of the design parameters of the optical fibers of the first to the third calculation examples. FIG. 14 is a table of the optical characteristics and S/C ratios of the optical fibers of the first to the third calculation examples. As shown in FIG. 14, it was verified that the S/C ratio became larger as the absolute value of Δ2 became smaller.

Figure 15:
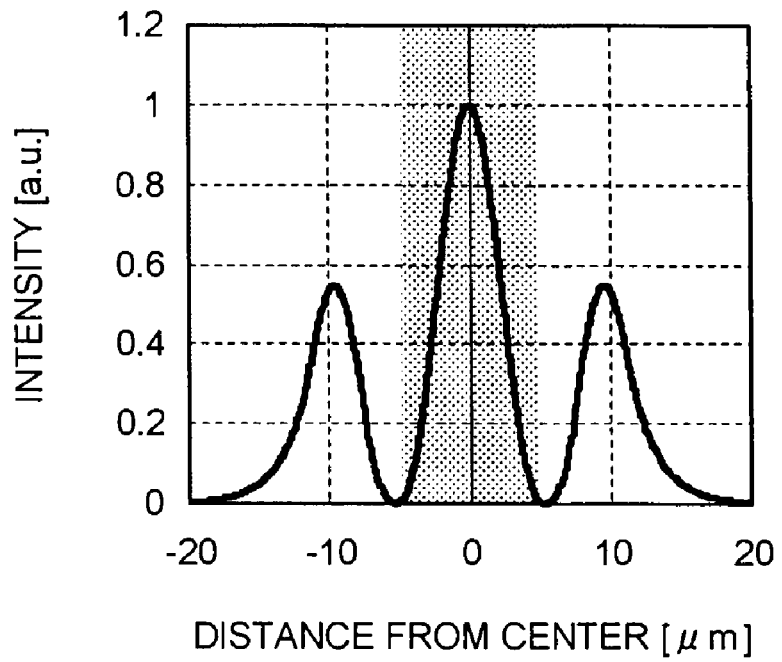
FIG. 15 is a graph of the field distribution of an LP02 mode in the first calculation example.
Figure 16:
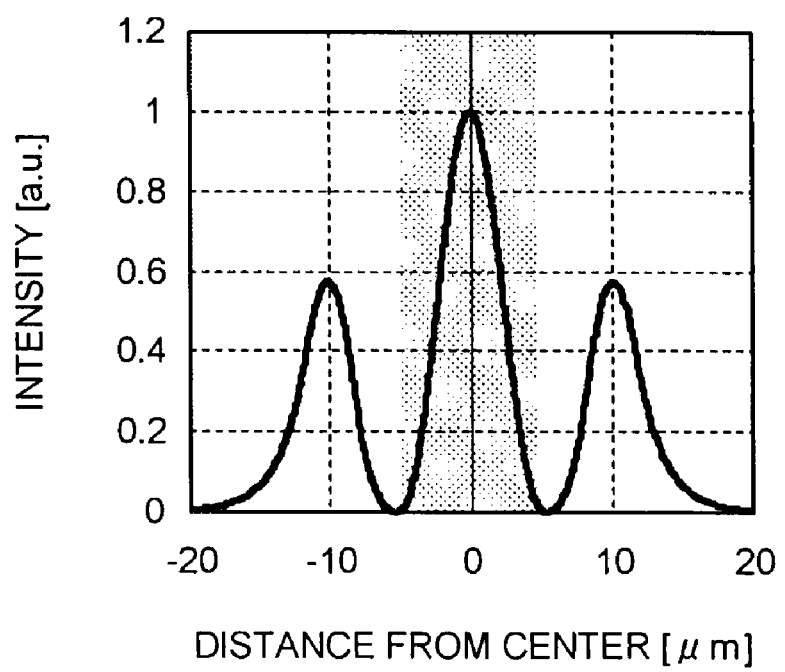
FIG. 16 is a graph of the field distribution of the LP02 mode in the second calculation example.
Figure 17:
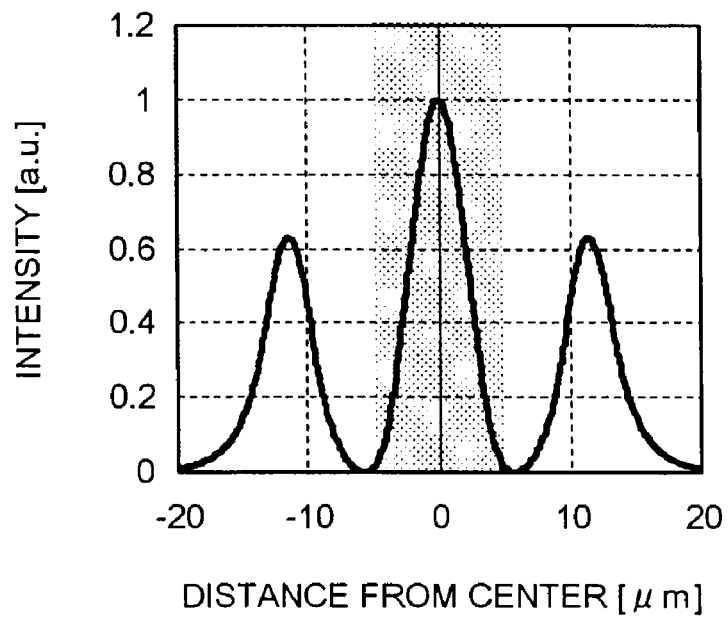
FIG. 17 is a graph of the field distribution of the LP02 mode in the third calculation example.
Figure 18:
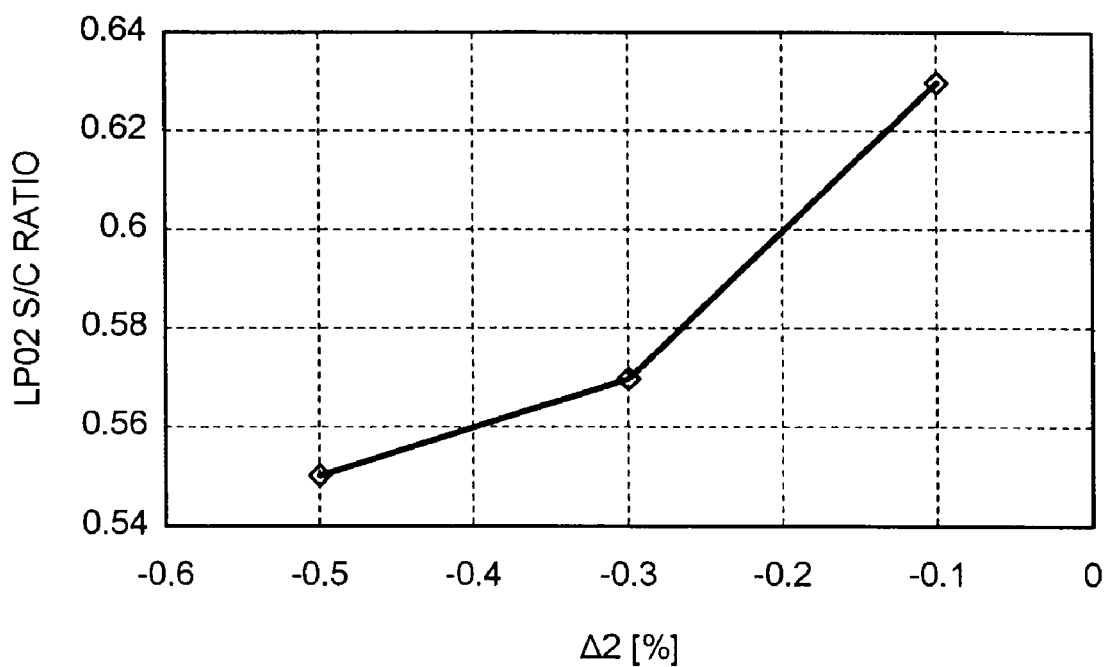
FIG. 18 is a graph of the relationship between $\Delta 2$ and the S/C ratio in the LP02 mode in the first to the third calculation examples.

FIGS. 15 to 17 are graphs of field distributions in the LP02 mode respectively in the first to the third calculation examples. In FIGS. 15 to 17, the intensity represented by the axis of ordinate is normalized using the intensity of the center peak. FIG. 18 is a graph of the relations between Δ2 and the S/C ratio in the LP02 mode in the first to the third calculation examples. As shown in FIGS. 15 to 18, the peak intensity of the side peak becomes higher as the absolute value of Δ2 becomes smaller and, as a result, the S/C ratio becomes larger.

Figure 19:
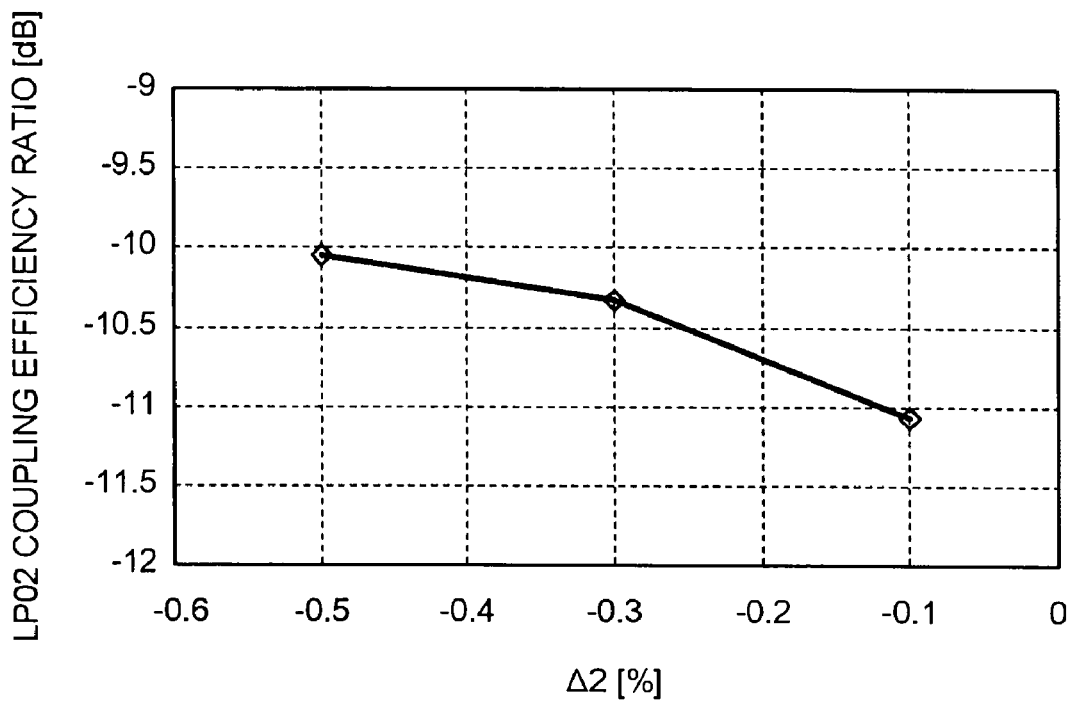
FIG. 19 is a graph of the relationship between $\Delta 2$ and the coupling efficiency ratio in the LP02 mode.

The ratio of the coupling efficiency to the LP02 mode to the sum of the coupling efficiency of each of the above four propagation modes (the LP01, the LP02, the LP11, and the LP21) is defined as the coupling efficiency ratio of the LP02 mode. The coupling efficiency ratio was calculated for the first to the third calculation examples. FIG. 19 is a graph of the relationship between Δ2 and the coupling efficiency ratio in the LP02 mode. The unit of the coupling efficiency ratio was "dB". As shown in FIG. 19, it was verified that the coupling efficiency ratio in the LP02 mode became smaller as the absolute value of Δ2 became smaller, that is, the S/C ratio became larger.

Figure 20:
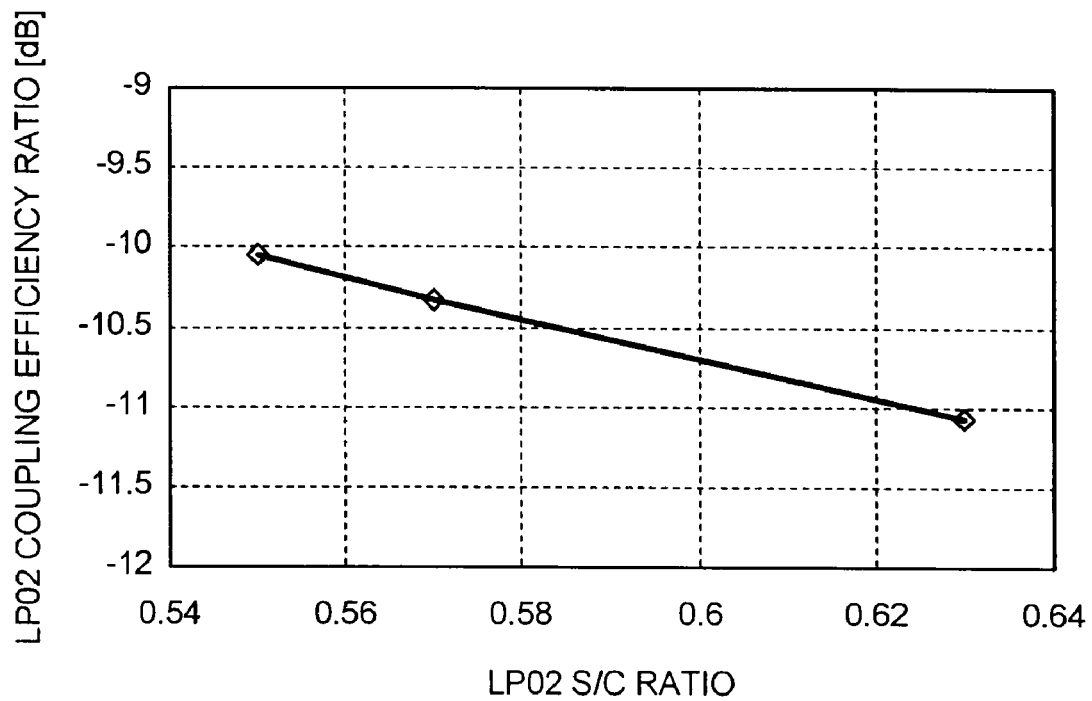
FIG. 20 is a graph of the relationship between the S/C ratio in the LP02 mode and the coupling efficiency ratio in the LP02 mode.

FIG. 20 is a graph of the relationship between the S/C ratio in the LP02 mode and the coupling efficiency ratio in the LP02 mode. As shown in FIG. 20, it was verified that the rate by which the LP02 mode was excited could be suppressed when the S/C ratio is increased.

Similarly, assuming that all of the center core region 1, the inner core layer 2, and the outer core layer 3 each have the step-type refractive index profile, the field shape in the LP02 mode was checked fixing Δ2 at −0.1% and varying Δ3, as a fourth to a sixth calculation examples. Δ1, b/a, c/a, and 2a were properly optimized such that, at the wavelength of 1550 nanometers in the LP01 mode, the wavelength dispersion was 5 ps/nm/km, $\beta/k$ was 1.4465, the dispersion slope was 0.015 ps/nm$^2$/km, and the effective core area was 72 µm$^2$.

FIG. 21 is a table of the design parameters of each of the optical fibers of the fourth to the sixth calculation examples. FIG. 22 is a table of the optical characteristics and the S/C ratio of each of the optical fibers of the fourth to the sixth calculation examples. As shown in FIG. 22, it was verified that the S/C ratio became larger as $\Delta 3$ became larger.

Similarly, assuming that the center core region 1 has the α-type refractive index profile and both of the inner core layer 2 and the outer core layer 3 each have the step-type refractive index profile, the field shape in the LP02 mode was checked fixing $\Delta 2$ and $\Delta 3$ respectively at −0.1% and 0.3% and varying $\alpha 1$, as a seventh to a ninth calculation examples. The $\Delta 1$, b/a, c/a, and 2a were properly optimized such that, at the wavelength of 1550 nanometers in the LP01 mode, the wavelength dispersion was 5 ps/nm/km, $\beta/k$ was 1.4465, the dispersion slope was 0.015 ps/nm$^2$/km, and the effective core area was 72 µm$^2$.

FIG. 23 is a table of the design parameters of the optical fibers of the seventh to the ninth calculation examples. FIG. 24 is a table of the optical characteristics and the S/C ratio of each of the optical fibers of the seventh to the ninth calculation examples. "Step" in "$\alpha 1$" of FIG. 23 means the case where the refractive index profile of the center core region 1 is the step type when $\alpha 1$ is set at the infinity. As shown in FIG. 24, it was verified that the S/C ratio became larger as $\alpha 1$ became larger.

Assuming that all of the center core region 1, the inner core layer 2, and the outer core layer 3 each have the step-type refractive index profile, the field shape in the LP02 mode was checked fixing $\Delta 2$ and $\Delta 3$ respectively at −0.1% and 0.3%, as a tenth to a twelfth calculation examples. $\Delta 1$, b/a, c/a, and 2a were properly optimized such that, at the wavelength of 1550 nanometers in the LP01 mode, the wavelength dispersion was 5 ps/nm/km, $\beta/k$ was 1.4465, the effective core area was 72 µm$^2$, and the dispersion slope is varied.

FIG. 25 is a table of the design parameters of the optical fibers of the tenth to the twelfth calculation examples. FIG. 26 is a table of the optical characteristics and the S/C ratios of the optical fibers of the tenth to the twelfth calculation examples. As shown in FIG. 26, it was verified that the S/C ratio became larger as the dispersion slope became smaller. The coupling efficiency ratio of the twelfth calculation example was −11.7 dB.

FIG. 27 is a table of the relationship between the wavelength dispersion and the S/C ratio obtained when the design parameters were optimized using the same method as that of the tenth to the twelfth calculation examples such that the wavelength dispersion was varied, as a thirteenth to a fifteenth calculation examples. FIG. 28 is a table of the relationship between the effective core area and the S/C ratio obtained when the design parameters were optimized such that the effective core area was varied, as a sixteenth to an eighteenth calculation examples. FIG. 29 is a table of the relationship between $\beta/k$ and the S/C ratio obtained when the design parameters were optimized such that $\beta/k$ was varied, as a nineteenth to a twenty-first calculation examples. As shown in FIGS. 27 to 29, it was verified that the S/C ratio became larger as the wavelength dispersion became larger or the effective core area became smaller or $\beta/k$ became smaller.

As above, it was verified that, by properly adjusting the design parameters and the optical characteristics of the optical fiber 10 according to the first embodiment, the S/C ratio could be increased and, when a signal light was input through a single-mode optical fiber, the LP01 mode could be excited at high efficiency. It was further verified that the LP01 mode could be excited at high efficiency because the optical fiber 10 had the dispersion slope that is reduced maintaining the effective core area.

Description will be given for the optical characteristics obtained when optical fibers according to the first embodiment were actually manufactured as a first to a sixth examples of the present invention. FIG. 30 is a table of the design parameters of optical fibers according to the first to the fourth examples. FIG. 31 is a table of the optical characteristics of the optical fibers according to the first to the sixth examples. The optical characteristics shown in FIG. 31 are those in the fundamental propagation mode measured at the wavelength of 1550 nanometers. "$\lambda c$" represents the cutoff wavelength. The cutoff wavelength is at the longer side of the signal light wavelength. Therefore, it is difficult to measure the cutoff wavelength for a conventional optical communication measuring apparatus, so that an estimated value estimated from the design parameters is shown.

As shown in FIG. 31, the optical fibers according to the first to the fourth examples each have: the cutoff wavelength of 1550 nanometers or longer; the wavelength dispersion in the fundamental propagation mode at the wavelength of 1550 nanometers of 4 ps/nm/km to 7 ps/nm/km; the dispersion slope of a positive value of 0.03 ps/nm$^2$/km or smaller; the effective core area of 60 µm$^2$ or larger; and the bending loss of 20 dB/m or smaller.

Figure 32:
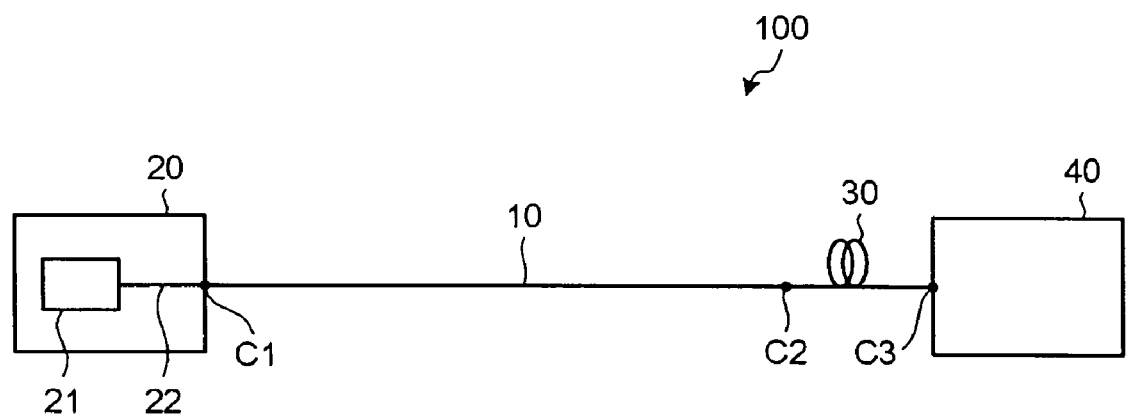
FIG. 32 is a schematic diagram of an optical transmission system including an optical-fiber transmission line according to a second embodiment of the present invention.

Description will be given for an optical-fiber transmission line according to a second embodiment of the present invention. FIG. 32 is a schematic view showing schematically an optical transmission system including an optical-fiber transmission line according to the second embodiment. The optical transmission system 100 includes: an optical transmitter 20 having a signal light source 21 that generates a WDM signal light in the C-band and a standard single-mode optical fiber 22 connected to the signal light source 21; the optical fiber 10 according to the first embodiment that is an optical transmission line connected to the optical transmitter 20 at a connecting point C1; a dispersion compensating optical fiber 30 connected to the optical fiber 10 at a connecting point C2; and an optical receiver 40 connected to the dispersion compensating optical fiber 30 at a connecting point C3. The length of the optical fiber 10 is about 10 kilometers to 1,000 kilometers. The dispersion compensating optical fiber 30 does not always need to be included.

In the optical transmission system 100, the optical transmitter 20 generates the WDM signal from the signal light source 21 and inputs this WDM signal light into the optical fiber 10 through the single-mode optical fiber 22. As a result, in the optical fiber 10, only the fundamental propagation mode is selectively excited and the optical fiber 10 transmits the WDM optical signal in the fundamental propagation mode. Thereby, single-mode optical transmission is realized.

As above, the optical fiber 10 has the dispersion slope of a positive value of 0.03 ps/nm$^2$/km or smaller and the effective core area of 60 µm$^2$ or larger in the fundamental propagation mode at the wavelength of 1550 nanometers and, therefore, the optical fiber 10 enables large-capacity optical signal transmission of which the generation of the nonlinear optical phenomena and the increase of the deviation of the wavelength dispersion between optical signals are significantly suppressed. The waveform of the WDM signal light propagated in the optical fiber 10 is somewhat distorted due to the small wavelength dispersion that the optical fiber 10 has. However, this distortion is dispersion-compensated by the dispersion compensating optical fiber 30 and the signal light is received by the optical receiver 40 without any distortion of the waveform thereof.

In the optical transmission system, the optical-fiber transmission line according to the second embodiment may be connected to, for example, an optical relay that uses an optical amplifier, etc., being not limited to the case where the optical-fiber transmission line is connected to the optical transmitter. For a conventional optical relay, the optical input/output unit thereof is connected to a single-mode optical fiber. Therefore, the optical-fiber transmission line according to the second embodiment can input a signal light through a single-mode optical fiber when the transmission line is connected to an optical relay.

A single-mode optical fiber may be connected in advance to an optical input of an optical-fiber transmission line according the second embodiment by fusion splicing. When the single-mode optical fiber is connected to the optical input of the optical-fiber transmission line, the coupling efficiency ratio of the LP02 mode can be further lowered by precisely aligning each center axis. Therefore, the fundamental propagation mode can be selectively excited more securely in the optical-fiber transmission line.

Figure 33:
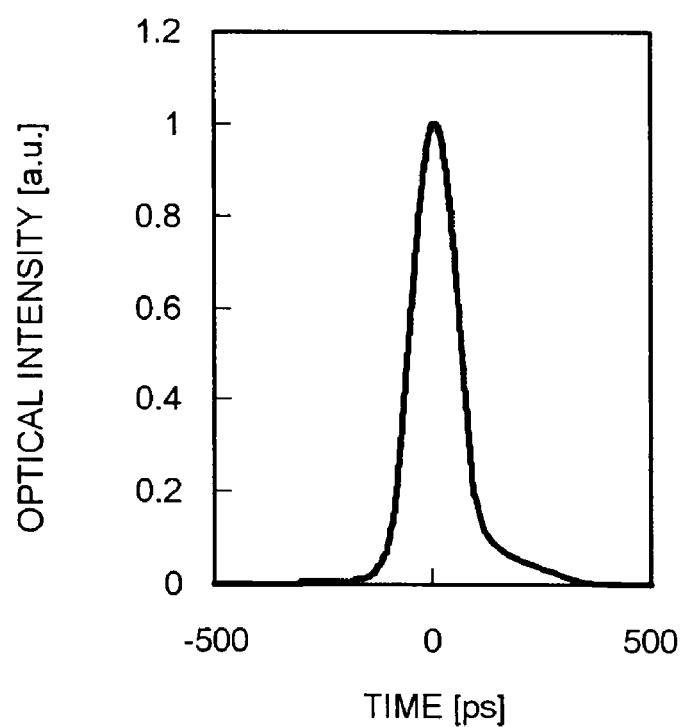
FIG. 33 is a graph of the waveform of a pulse light beam to be input.
Figure 34:
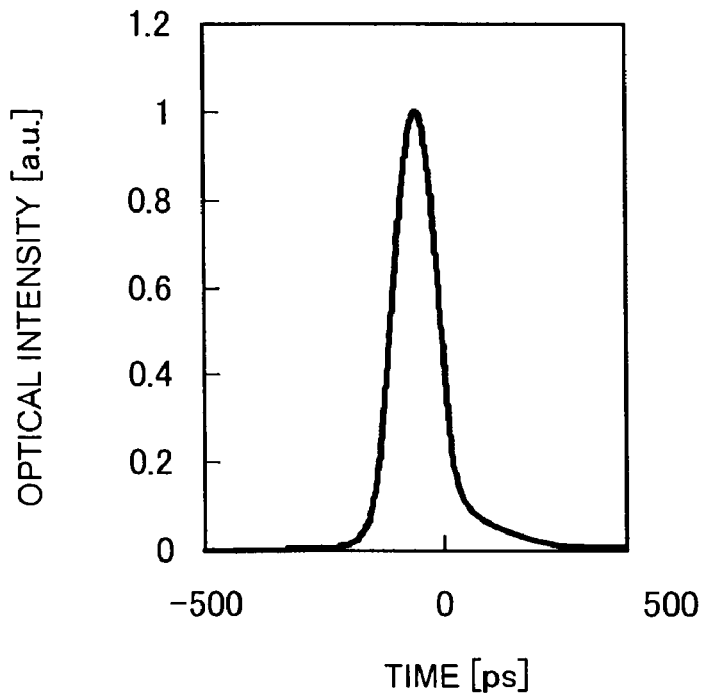
FIG. 34 is a graph of the waveform of the pulse light beam output from an optical fiber sample A1.
Figure 35:
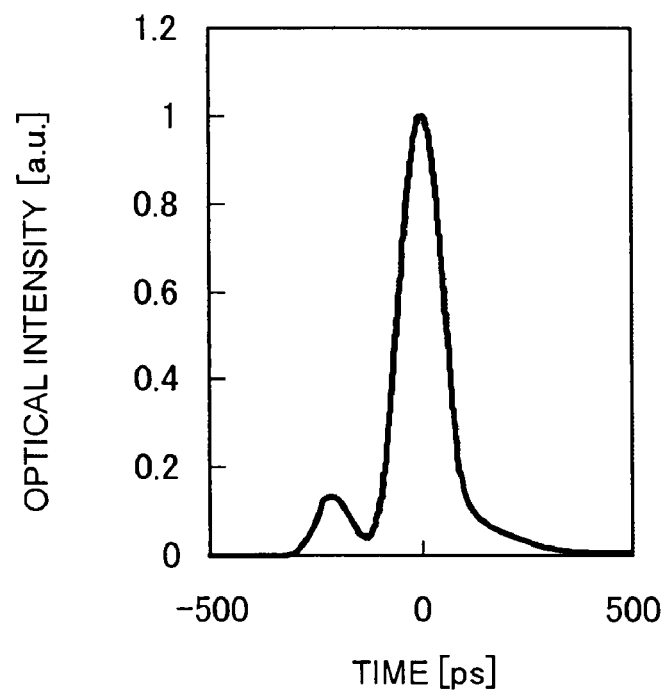
FIG. 35 is a graph of the waveform of the pulse light beam output from the optical fiber sample B1.

An experiment was carried out to verify propagation modes excited when a light beam is input into the optical fiber according to the above first example. The optical fiber according to the first example of which the length is set at 30 m and a standard single-mode optical fiber (SMF) were first prepared. An optical fiber sample A1 formed by connecting these optical fibers such that the central axes respectively of these optical fibers were aligned, and an optical fiber sample B1 formed by connecting these optical fibers such that the central axes respectively of these optical fibers were away from each other (offset) by 10 micrometers were assembled. A pulse light beam having the central wavelength of 1550 nanometers, the cycle frequency of 300 MHz, and a waveform shown in FIG. 33 was input from the end on the side of the SMF of each of the optical fiber samples A1 and B1, and the waveform of the pulse light beam output from the end on the side of the optical fiber according to the first example was measured. In FIG. 33 and FIGS. 34 and 35 shown below, the axis of abscissa represents time taken relative to the peak position of the pulse light beam and the axis of abscissa represents the light intensity (in an arbitrary unit).

FIG. 34 is a graph of the waveform of the pulse light beam output from the optical fiber sample A1. As shown in FIG. 34, a pulse light beam without any distortion that has the same wavelength as that of the pulse light beam input shown in FIG. 33 was output from the optical fiber sample A1. That is, for the optical fiber sample A1, it was verified that only the fundamental propagation mode was selectively excited in the optical fiber according to the first example.

On the other hand, FIG. 35 is a graph of the waveform of a pulse light beam output from the optical fiber sample B1. As shown in FIG. 35, a pulse light beam having a distorted waveform was output from the optical fiber sample B1. That is, for the optical fiber sample B1, it was verified that not only the fundamental propagation mode but also higher-order modes were excited in the optical fiber according to the first example.

An experiment of optical transmission was then carried out using the optical fiber according to the first example as an optical transmission line. The optical fiber according to the first example of which the length was set at 500 m and an SMF were first prepared. An optical fiber sample A2 formed by connecting these optical fibers such that the central axes respectively of these optical fibers were aligned, and an optical fiber sample B2 formed by connecting these optical fibers such that the central axes respectively of these optical fibers were away from each other (offset) by 10 micrometers were assembled.

Using these optical fiber samples A1, A2, B1, and B2 as optical transmission lines, an optical signal was input from the end on the side of each SMF and the bit error rate (BER) characteristic of the transmitted optical signal was measured. An optical signal formed by superimposing an NRZ signal having a pseudo-random bit pattern of $2^{31}-1$ and the modulation frequency of 10 GHz/s on a laser light beam output from a DFB laser light source and having the wavelength of 1551.465 nanometers, and amplifying the laser light beam with an optical fiber amplifier was used as the optical signal transmitted.

Figure 36:
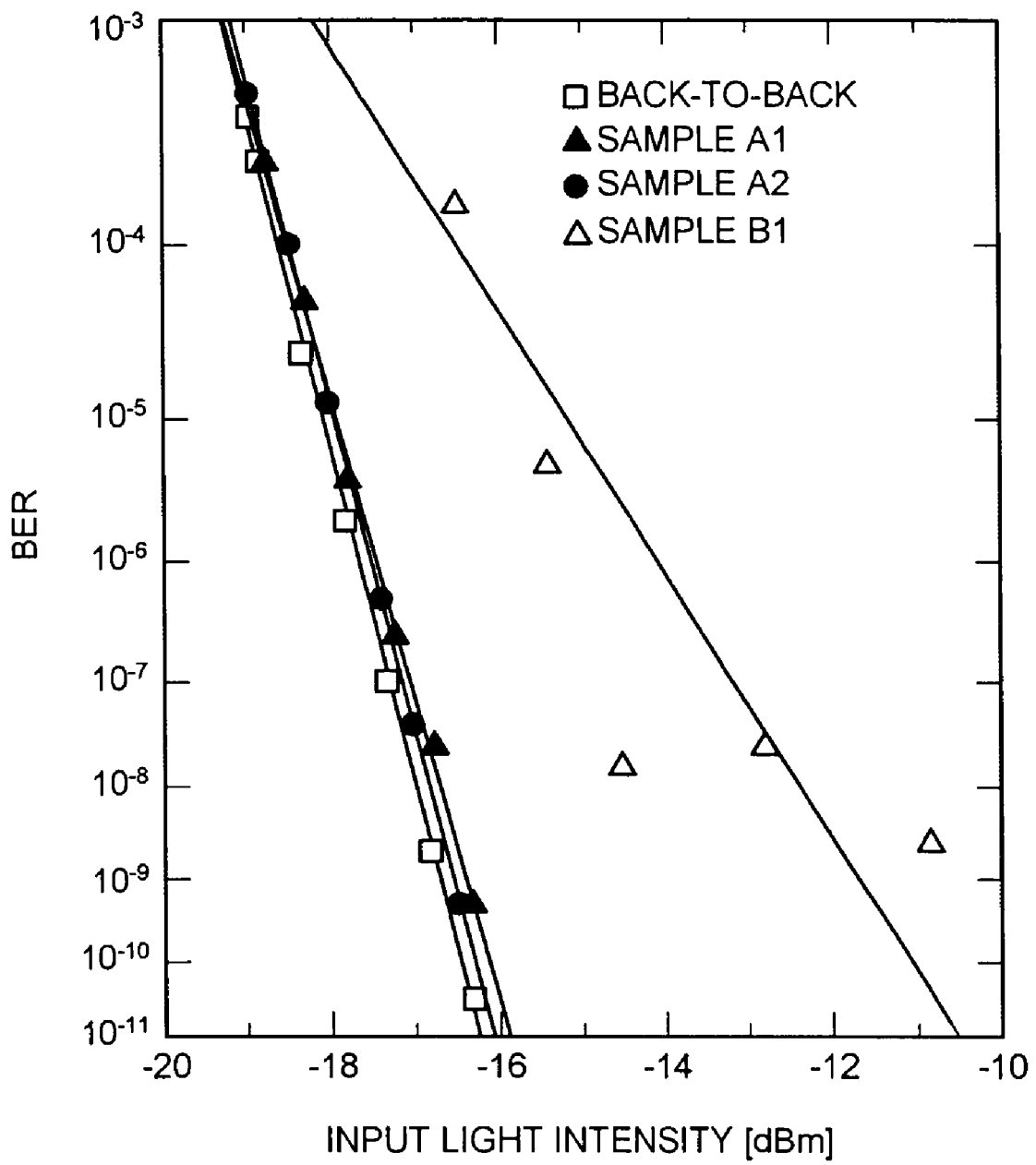
FIG. 36 is a graph of the measurement result of the BER characteristic.
Figures 37, 38:
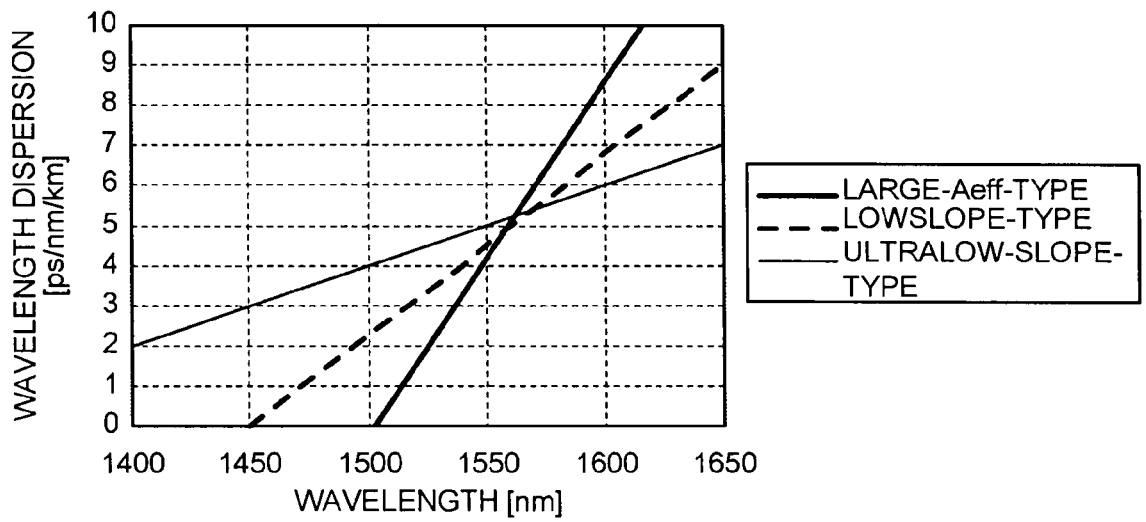
FIG. 37 is a table of optical characteristics at the wavelength of 1550 nanometers of nonzero dispersion-shifted optical fibers respectively of a large-Aeff-type having the expanded effective core area, a low-slope-type having a reduced dispersion slope, and an ultralow-slope-type.
FIG. 38 is a graph of the relationship between the wavelength and the wavelength dispersion of each nonzero dispersion-shifted optical fiber shown in FIG. 37.

FIG. 36 is a graph of the measurement result of the BER characteristic. As shown in FIG. 36, when the optical fiber samples A1 and A2 were used as the optical transmission lines, it was verified that optical transmission lines without power penalty were realized. On the other hand, as shown in FIG. 36, when the optical fiber sample B1 was used, a large power penalty was generated. When the optical fiber sample B2 was used, the stability of the received light intensity was poor and the measurement of the BER was impossible.

As described above, according to an aspect of the present invention, the optical fiber according to the present invention exerts an effect that the trading-off relationship between the effective core area and the dispersion slope is moderated in the fundamental propagation mode, and generation of non-linear optical phenomena and increase of the deviation of the wavelength dispersion between optical signals can significantly be suppressed because the optical fiber has the cutoff wavelength of the wavelength of the signal light or longer.

Furthermore, according to another aspect of the present invention, the optical-fiber transmission line according to the present invention exerts an effect that, by inputting a signal light into the optical fiber according to the present invention through a single-mode optical fiber and transmitting the signal light, only the fundamental propagation mode is selectively excited in the optical fiber according to the invention and, as a result, the optical-fiber transmission line enables large-capacity optical transmission for which generation of nonlinear optical phenomena and increase of the deviation of the wavelength dispersion between optical signals can significantly be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber that transmits at least a signal light including a wavelength of 1550 nanometers in a fundamental propagation mode, the optical fiber having, a cutoff wavelength equal to or longer than 1550 nanometers, a wavelength dispersion of 4 ps/nm/km to 7 ps/nm/km in the fundamental propagation mode at the wavelength of 1550 nanometers, a dispersion slope of a positive value equal to or smaller than 0.03 ps/nm$^2$/km in the fundamental propagation mode at the wavelength of 1550 nanometers, an effective core area equal to or larger then 60 μm$^2$ in the fundamental propagation mode at the wavelength of 1550 nanometers, and a bending loss equal to or smaller than 20 dB/m with a winding of 16 turns at a diameter of 20 millimeters in the fundamental propagation mode at the wavelength of 1550 nanometers.

2. The optical fiber according to claim 1, comprising:
a center core region having a first refractive index;
an inner core layer formed on an outer circumference of the center core region, the inner core layer having a second refractive index lower than the first refractive index;
an outer core layer formed on an outer circumference of the inner core layer, the outer core layer having a third refractive index lower than the first refractive index and higher than the second refractive index; and
a cladding layer formed on an outer circumference of the outer core layer, the cladding layer having a fourth refractive index higher than the second refractive index and lower than the third refractive index, wherein
a relative refractive index difference of the center core region to the cladding layer is equal to or smaller than 0.55%,
a relative refractive index difference of the inner core layer to the cladding layer is −0.7% to 0%,
a relative refractive index difference of the outer core layer to the cladding layer is 0.1% to 0.5%,
a ratio of an outer diameter of the inner core layer to a diameter of the center core region is equal to or larger than 1.4,
a ratio of an outer diameter of the outer core layer to the diameter of the center core region is equal to or larger than 2.1, and
the diameter of the center core region is equal to or larger than 6.8 micrometers.

3. An optical-fiber transmission line comprising:
an optical fiber that transmits at least a signal light including a wavelength of 1550 nanometers in a fundamental propagation mode, the optical fiber having, a cutoff wavelength equal to or longer than 1550 nanometers, a wavelength dispersion of 4 ps/nm/km to 7 ps/nm/km in the fundamental propagation mode at the wavelength of 1550 nanometers, a dispersion slope of a positive value equal to or smaller than 0.03 ps/nm²/km in the fundamental propagation mode at the wavelength of 1550 nanometers, an effective core area equal to or larger then 60 µm² in the fundamental propagation mode at the wavelength of 1550 nanometers, and a bending loss equal to or smaller than 20 dB/m with a winding of 16 turns at a diameter of 20 millimeters in the fundamental propagation mode at the wavelength of 1550 nanometers; and
a single-mode optical fiber configured to be connected to the optical fiber, the single-mode optical fiber having a cutoff wavelength shorter than 1550 nanometers, wherein
the signal light is input into the optical fiber through the single-mode optical fiber.

4. The optical-fiber transmission line according to claim 3, wherein
the optical fiber includes
a center core region having a first refractive index,
an inner core layer formed on an outer circumference of the center core region, the inner core layer having a second refractive index lower than the first refractive index,
an outer core layer formed on an outer circumference of the inner core layer, the outer core layer having a third refractive index lower than the first refractive index and higher than the second refractive index, and
a cladding layer formed on an outer circumference of the outer core layer, the cladding layer having a fourth refractive index higher than the second refractive index and lower than the third refractive index, and
a relative refractive index difference of the center core region to the cladding layer is equal to or smaller than 0.55%,
a relative refractive index difference of the inner core layer to the cladding layer is −0.7% to 0%,
a relative refractive index difference of the outer core layer to the cladding layer is 0.1% to 0.5%,
a ratio of an outer diameter of the inner core layer to a diameter of the center core region is equal to or larger than 1.4,
a ratio of an outer diameter of the outer core layer to the diameter of the center core region is equal to or larger than 2.1, and
the diameter of the center core region is equal to or larger than 6.8 micrometers.

* * * * *